US012737601B1

(12) United States Patent
Ratnalikar et al.

(10) Patent No.: US 12,737,601 B1
(45) Date of Patent: Sep. 15, 2026

(54) TENSOR REMATERIALIZATION

(71) Applicant: Amazon Technologies, Inc., Seattle, WA (US)

(72) Inventors: Pushkar Ratnalikar, San Jose, CA (US); Hongbin Zheng, San Jose, CA (US); Ron Diamant, San Jose, CA (US); Amith Rajith Mamidala, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 758 days.

(21) Appl. No.: 18/067,510

(22) Filed: Dec. 16, 2022

(51) Int. Cl.
*G06N 3/063* (2023.01)
*G06F 9/50* (2006.01)
*G06N 3/082* (2023.01)

(52) U.S. Cl.
CPC ........... *G06N 3/063* (2013.01); *G06F 9/5016* (2013.01); *G06N 3/082* (2013.01)

(58) Field of Classification Search
CPC ....... G06N 3/063; G06N 3/082; G06F 9/5016
USPC ............................................................ 706/15
See application file for complete search history.

(56) References Cited

U.S. PATENT DOCUMENTS 11,086,968 B1 * 8/2021 Baskaran ............ G06F 16/1744
12,354,015 B2 * 7/2025 Hall ......................... G06N 3/10

OTHER PUBLICATIONS

Schuler, et al., "XEngine: Optimal rensor rematerialization for neural network in heterogeneous enribonments", ACM Transactions on architecture and code optimization, vol. 20, No. 2, Article 17, Dec. 2022 (Year: 2022).*

(Continued)

*Primary Examiner* — Tsu-Chang Lee
(74) *Attorney, Agent, or Firm* — Weaver Austin Villeneuve & Sampson LLP

(57) ABSTRACT

A technique for rematerializing a tensor in a neural network model may include identifying a candidate operator for rematerialization in a representation of a data flow graph for a neural network model. An operator can be identified as a candidate operator if it generates a tensor that is used multiple times in the neural network model and belongs to a set of permitted operators for rematerialization. An operator chain that starts at one or more source operators and ends at the candidate operator is determined. A profitability of rematerializing the operator chain is determined based on a comparison of a memory footprint of source data for the one or more source operators, and a memory footprint of the tensor. If it is determined that rematerializing the operator chain is profitable, the operator chain is inserted in the representation of the data flow graph where the tensor is reused.

23 Claims, 11 Drawing Sheets

(56) References Cited

OTHER PUBLICATIONS

Chen, T., et al., "Training Deep Nets with Sublinear Memory Cost," arXiv:1604.06174v2 [cs.LG], Apr. 22, 2016, pp. 1-12, URL: https://arxiv.org/abs/1604.06174v2.
Jain, P., et al., "Checkmate: Breaking the Memory Wall with Optimal Tensor Rematerialization," Proc. of the 3rd Conference on Machine Learning and Systems (MLSys 2020), arXiv.:1910.02653v3 [cs.LG], May 14, 2020, pp. 1-15, URL: https://arxiv.org/abs/1910.02653v3.
Kumar, R., et al., "Efficient Rematerialization for Deep Networks," Proc. of the 33rd Conference on Neural Information Processing Systems (NeurIPS 2019), Dec. 2019, pp. 1-10, URL: https://proceedings.neurips.cc/paper/2019/file/ffe10334251de1dc98339d99ae4743ba-Paper.pdf.
Punjani, M. "Register Rematerialization in GCC," Proc. of the GCC Developers' Summit, 2004, pp. 131-140, URL: http://www.netgull.com/gcc/summit/2004/Register%20Rematerialization.pdf.

* cited by examiner

TENSOR REMATERIALIZATION

BACKGROUND

Machine learning utilizes neural network models to perform complex tasks such as image recognition, natural language processing, among others. A neural network can be represented using a data flow graph that includes different types of operations to be performed on an input data set. The operations may include computations, data reshaping operations, memory accesses, and/or other operations. A compiler can be used to generate machine level instructions based on the data flow graph, which can be executed by a computing device to generate output data based on the input data set.

BRIEF DESCRIPTION OF THE DRAWINGS

Various embodiments in accordance with the present disclosure will be described with reference to the drawings, in which.

DETAILED DESCRIPTION

Figure 1:
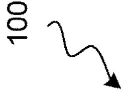
FIG. 1 shows a simplified block diagram of an example of a computing system.
Figure 1:
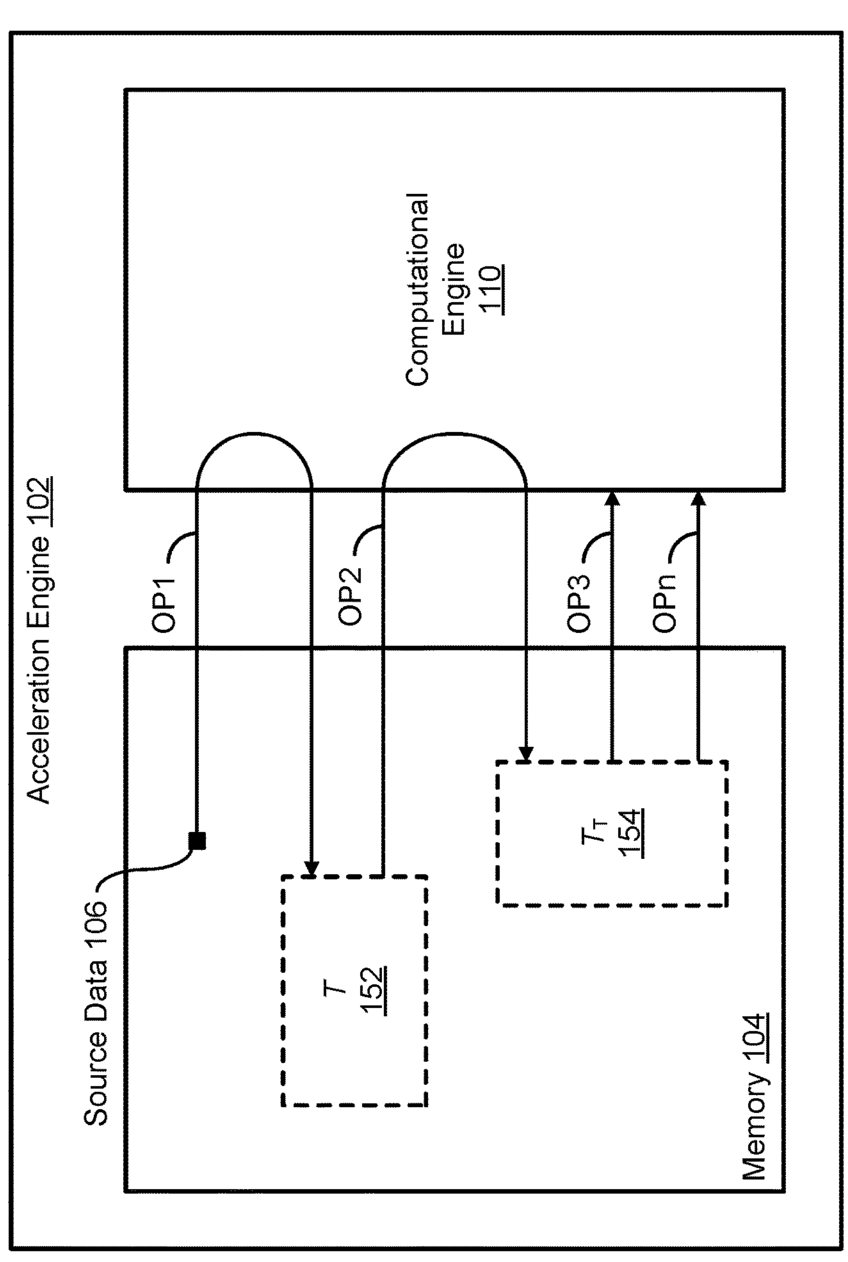

The application of machine learning to ever more complex tasks has led to neural network models expanding in both complexity and size. As a result, the memory capacity of most accelerators is typically not sufficient to fit the entire model data and activations that are generated during runtime. Neural network models typically include some tensors that are reused during execution of the neural network. For example, the same tensor can be generated and used during a forward pass and then later reused during a backward pass of a training process. Some tensors that are reused can have a long live range from when the tensor is first generated to when the tensor is last used. However, there can be large gaps in between when the tensor is not actively being used. Tensors that are used multiple times can be stored in the on-chip buffer, or be written to system memory and read back at a later time. However, retaining tensors in memory when they are not in use can increase the runtime memory footprint, and thus increasing the memory pressure on the on-chip buffer. One technique to reduce the runtime memory footprint is rematerialization. Instead of storing the reused tensors in memory, rematerialization recomputes the tensor when it is used at a later time. This can reduce the runtime memory footprint, but it comes at the cost of increased execution time to repeat the computations.

The techniques disclosed herein can be used to implement rematerialization of tensors in a neural network model while taking into account the computational penalty of the rematerialization. The rematerialization can be performed by a compiler that generates machine level code for the neural network model from a description of the neural network written in a programming language. The compiler can perform the rematerialization by identifying a candidate operator in the data flow graph representation of the neural network model. The candidate operator can be a low arithmetic intensity operator that generates a tensor being used multiple times in the neural network model. An operator chain can be formed by expanding the identified candidate operator into a series of operators to capture other low arithmetic intensity operators that are part of the sequence of operations performed to generate the tensor. A profitability assessment can be made on the operator chain to determine whether rematerializing the operator chain will reduce the memory footprint. If rematerializing the operator chain is deemed profitable, the compiler can insert the operator chain at the reuse location in the data flow graph to shorten the live range of the original tensor and reduce the runtime memory footprint.

Given that the rematerialization algorithm focuses on low arithmetic intensity operators to form the basis of the rematerialization chain, the computational penalty and the impact on execution time of the rematerialization can be minimal. Operators that are considered low arithmetic intensity (e.g., having a linear computational complexity of O(n) or less) can be provided as a list of permitted operators to allow the compiler to easily identify rematerialization candidates without using complex constraints solvers. Examples of such low arithmetic intensity operators may include data rearrangement operators, element-wise unary operators, and/or element-wise binary operators. By utilizing a list of permitted operators to identify rematerialization candidates, the rematerialization algorithm can be executed expeditiously in the compiler without degrading the compilation time.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a simplified block diagram of a computing system 100 that includes a hardware acceleration engine 102. Acceleration engine 102 can be, for example, a neural network processor. Acceleration engine 102 may include a computational engine 110 and a memory 104. Memory 104 can act as a buffer memory for computational engine 110. During operation, computational engine 110 may read data from memory 104, perform certain operations on the data, and write back the results of the operations back to memory 104. The results can be used again for later operations.

Computational engine 110 may include different types of compute engines. For example, in the context of a neural network processor, computational engine 110 may include a processing engine (PE) array (e.g., a systolic array) to perform matrix multiplication operations, an activation engine to apply activation functions to data, a pooling engine to perform pooling operations such as down-sampling of a data set, a vector compute engine to perform vectorized computations a data stream, and/or a direct memory access engine to perform data movement operations. In some implementations, computational engine 110 may include multiple instances of any of the compute engines.

During execution of a neural network model, acceleration engine 102 may generate a tensor that is used multiple times during the course of the neural network. For example, the tensor may first be used during a forward pass, and is later reused during a backward pass of a training process. Some tensors of the neural network model can be generated from a scalar or from functional data that is inputted into the neural network (e.g., pixel from an input image). By way of example, referring to FIG. 1, such data can be initially stored in memory 104 as source data 106. At operation OP1, computational engine 110 may broadcast the source data 106 into multiple memory locations to form an intermediate tensor T 152. At operation OP2, computational engine 110 may perform a data reshaping operation on intermediate tensor T 152, such as transposing intermediate tensor T 152 into tensor $T_T$ 154. At operation OP3, computational engine 110 may perform a certain computation using tensor $T_T$ 154.

At a later point in time, computational engine 110 may reuse tensor $T_T$ 154 and perform another computation on tensor $T_T$ 154 at operation OPn. In this example, tensor $T_T$ 154 may have a live range that spans from OP3 to at least OPn. Tensor $T_T$ 154 can be retained in computing system 100 (e.g., either retained in memory 104, or be written to system memory and then read back) between operation OP3 and operation OPn. However, doing so may not be the most efficient use of memory because tensor $T_T$ 154 is not used during the time between OP3 and OPn, but is still being stored in computing system 100.

To reduce the memory footprint, rather than retaining tensor $T_T$ 154, the rematerialization technique can repeat operations OP1 and OP2 just before operation OPn such that the amount of memory used to store tensor $T_T$ 154 is no longer needed between operations OP3 and OPn. Instead of having to store the entire tensor $T_T$ 154, computing system 100 only needs to store source data 106 to be able to rematerialize tensor $T_T$ 154. In some scenarios, computing system 100 may need to retain source data 106 (e.g., functional input data) for other operations anyway, so the rematerialization is able to reduce the memory footprint by the entire tensor size. However, the rematerialization does come at the cost of having to repeat operations OP1 and OP2. Given that operation OP1 is a broadcast operation and OP2 is a transpose operation, both of these operations are not arithmetic-intensive operations. As such, the impact on execution time to repeat these operations are minimal.

It should be noted that FIG. 1 is showing a simplified example of tensor generation, and that in other implementations, generation of a reused tensor may involve more operations and computations, and may involve more than one source data element. Nevertheless, rematerialization can be worthwhile if all the operators involved in generating the tensor are low arithmetic-intensive operators, and if the source data that forms the basis of the resulting tensor has a smaller memory footprint than the tensor.

A neural network model can be described using a high-level programming language, such as Java, C++, R, Go, Python, or Tensorflow. The neural network model can be processed by a compiler to generate machine level instructions that can be executed by an accelerator such as a neural network processor to generate output data based on an input dataset. The input dataset and the output data can be represented using tensors. The input dataset may correspond to an image, a text, an audio, or a video that needs to be operated on. The compiler can process the neural network model over multiple stages, which may include generating an intermediate representation (IR) of the neural network model based on the programming code of the model, performing hardware agnostic optimizations on the IR to generate a modified IR, performing hardware-specific optimizations on the modified IR for the given hardware architecture, and generating the machine level instructions for the given hardware architecture.

In some implementations, the intermediate representation (e.g., in the form of IR instructions) of the neural network model can represent a data flow graph. The data flow graph may include nodes and edges connecting the nodes. The nodes may represent operators such as computations, data rearrangements, and/or other operations; and the edges or connections between the nodes may represent dependencies between the nodes, such as data dependencies, memory dependencies, or operational dependencies, among other examples. Some of the operators in the data flow graph can be computational operators such as element-wise unary operators (e.g., datatype casting, inversion, bit-shift, etc.), element-wise binary operators (e.g., logical operations such as AND, OR, XOR, etc.; algebraic operations such as addition, subtraction, etc.), matrix multiplication, convolution, batch normalization, collective compute operators (e.g., all-reduce, all-gather, etc.), or other computational neural network operators. Some of the operators in the data flow graph can be data rearrangement operators such as broadcast, reshape, transpose, split, concatenate, etc.

Figure 2:
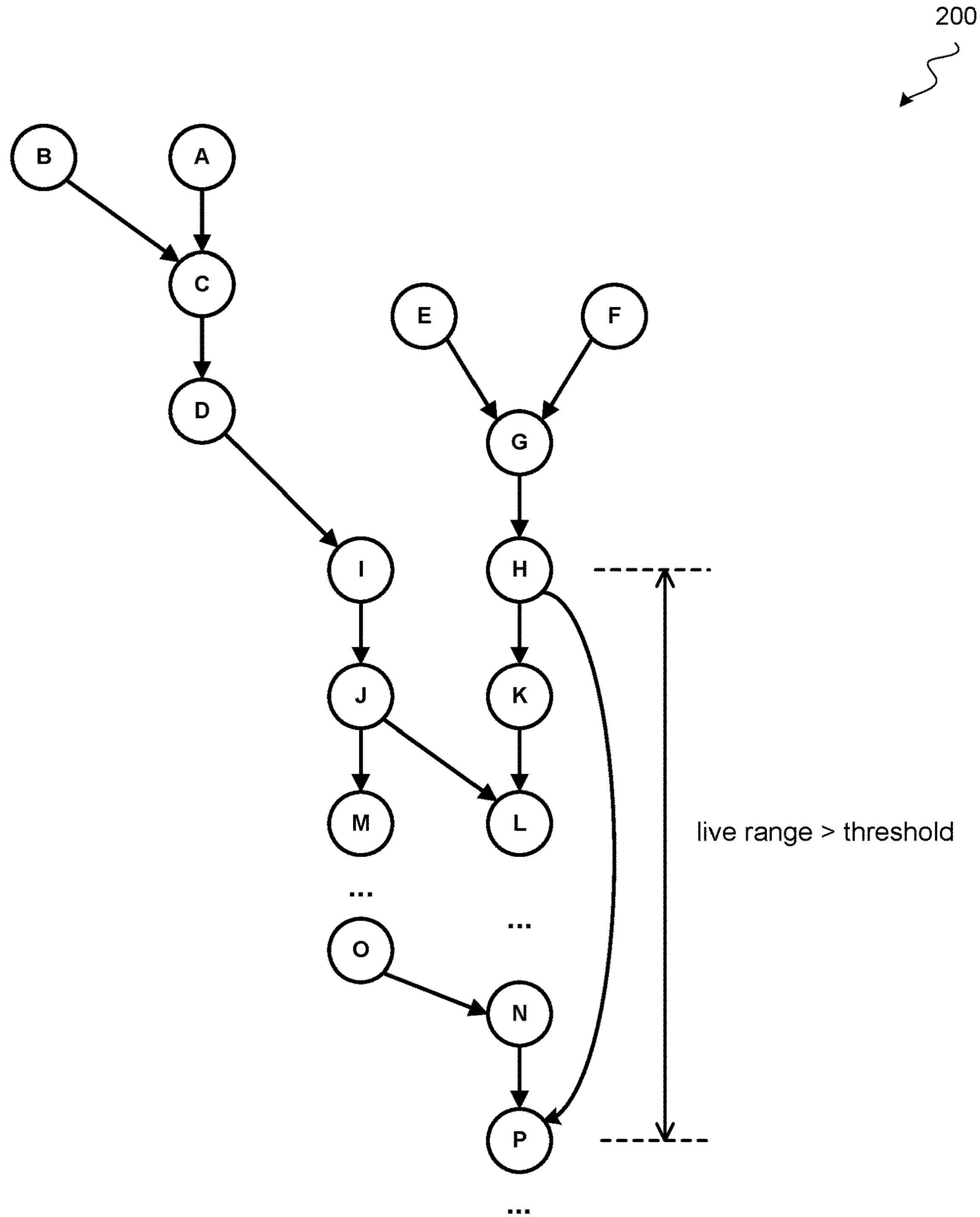
FIG. 2 shows an example of a data flow graph for a neural network model.

FIG. 2 shows an example of a data flow graph 200 for a neural network model. The neural network model may correspond to a neural network, which can be used to perform tasks such as image recognition, natural language processing, video processing, or text-based queries, among others. Data flow graph 200 can be, for example, in the form of IR instructions generated by an initial stage of the compiler. Data flow graph 200 may include multiple operators represented as nodes to perform operations such as data computations, data rearrangement, etc. For example, data flow graph 200 may include operators A to P. The edges between the operators may indicate the data flow and dependency. Note that the data flow graph 200 can be part of a bigger data flow graph with other operators, which are not shown here for the ease of illustration.

Each node or operator may generate a tensor, which is used as input to the next connected node. For instance, operators A and B may generate respective tensors that are used as input operands for operator C. Some operators may generate a tensor that is used multiple times in the neural network model. For example, operator J generates a tensor that is used by operator L. The tensor generated by operator J is also used by operator M. As another example, the tensor generated by operator H is used by operator K, and is later reused by operator P. A compiler can analyze a data flow graph such as data flow graph 200 (e.g., in the form of IR instructions) to implement rematerialization to reduce the runtime memory footprint. The rematerialization process will now be described using data flow graph 200 as an example.

Figure 3:
FIG. 3 shows an example of a candidate operator for rematerialization in a data flow graph.
Figure 3:
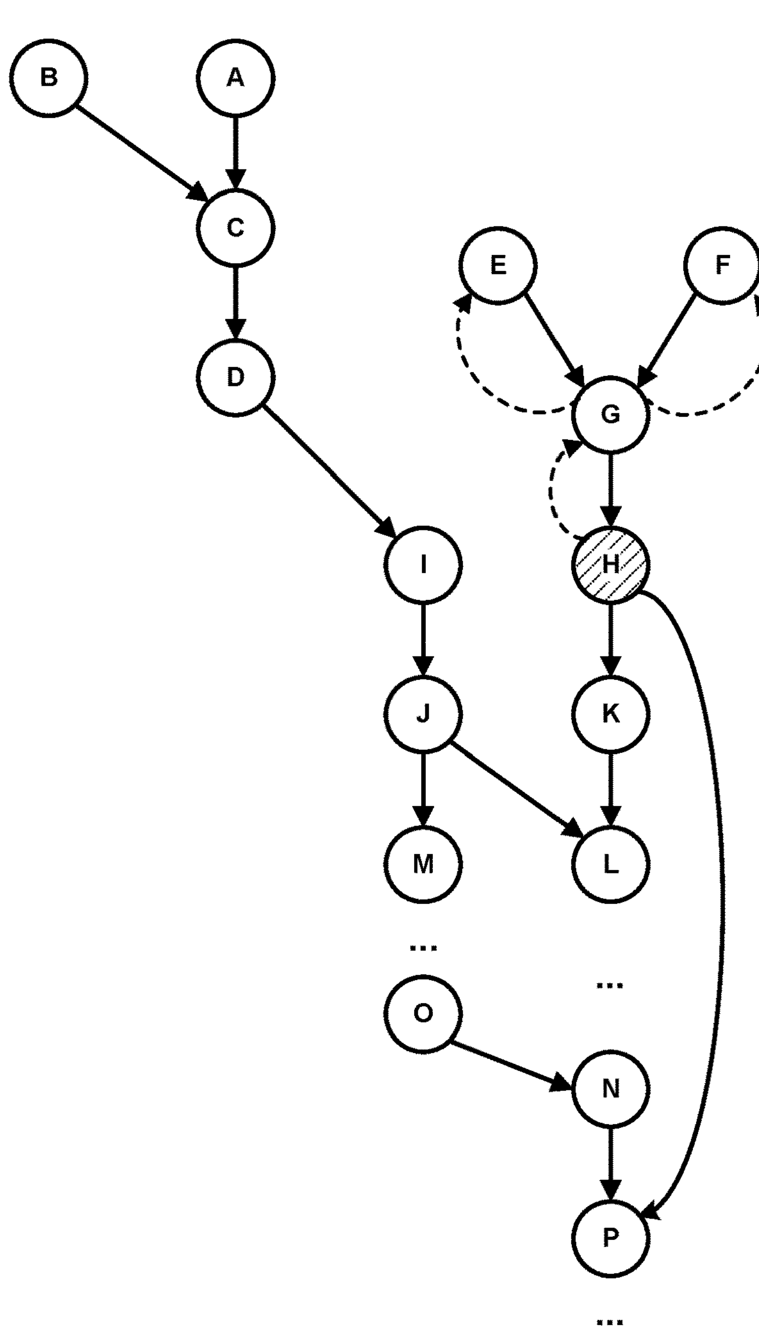

Referring to FIG. 3, a linear scan of the representation of data flow graph 200 can be performed to identify a candidate operator for rematerialization that is low arithmetic intensity, and generates a tensor that is used multiple times during execution of the neural network model. For example, the compiler may compare each operator or node in the data flow graph against a list of permitted operators that can be considered for rematerialization, and identify operators on the list and have multiple output edges or having an out-degree greater than one. The list of permitted operators may include operators having a linear computational complexity of O(n) or less. Examples of permitted operators may include data rearrangement operators such as broadcast, reshape, transpose, element-wise operators, add or subtract operators, etc. In some implementations, the list of permitted operators for rematerialization can be programmable and can be provided as user input into the compiler. The list of permitted operators can also vary depending on the hardware architecture of the accelerator.

In some implementations, tensors having short live ranges are not re-materialized. Retaining tensors with short live ranges in memory can be more efficient than rematerializing them because the impact of the tensor on the memory footprint is short-lived, and the limited memory savings may not outweigh the increase in execution time of recomputing the tensor. Hence, operators that generate tensors with short live ranges can be excluded from being considered for rematerialization. The live range of a tensor can be determined as the distance (e.g., number of edges) from the initial operator that generated the tensor to the last operator that uses the tensor as an operand. An operator in the data flow graph can be considered for rematerialization if the tensor generated by the operator has a live range greater than a minimum threshold number of operators in the data flow graph. If the tensor has a live range less than or equal to the minimum threshold number of operators, the operator can be excluded from being considered for rematerialization. The live range or the minimum threshold number of operators can be a programmable value, and can be provided as user input into the compiler.

In FIG. 3, operator H, which is shown with a diagonal fill pattern, can be an operator on the list of permitted operators. For example, operator H can be a reshaping operator, which is a low arithmetic-intensive operator. The tensor generated by operator H is used by operator K and then later by operator P. The distance between operator H and operator P can be greater than the minimum threshold number of operators, and thus the live range of the tensor generated by operator H is sufficient to be suitable for rematerialization. Accordingly, operator H can be identified as a candidate operator for rematerialization.

Operator J is another operator that generates a tensor being used by multiple operators M and L. However, even if operator J is on the list of permitted operators for rematerialization (e.g., a low arithmetic-intensive operator), operator J can be excluded from consideration because the live range of the tensor generated by operator J is short (e.g., only one operator in length in data flow graph 200). As such, operator J is not identified as a candidate operator for rematerialization.

For each candidate operator identified in the data flow graph, an operator chain can be determined from the candidate operator. For example, the data flow graph can be traversed backwards from the identified candidate operator along the connected edges to determine a series of operators that are executed to derive the reused tensor. In some implementations, the data flow graphed can be traversed back so long as the preceding operator is also on the list of permitted operators (e.g., also a low arithmetic intensity operator). In this manner, rematerialization of operator chains that include complex computations such as matrix multiplication can be avoided by defining the list of permitted operators to exclude such operators. In some implementations, rematerialization of operator chains that include operators used for collective compute (e.g., all-reduce, all-gather, etc.) on computations performed and exchanged between distributed processing nodes may also be avoided, because such operations may require synchronization overhead and communication overhead between different processing nodes.

In some implementations, the reused tensor can be derived from source data such as a scalar or functional input data to the neural network. If all of the operators used to derive the tensor from the source data are low arithmetic-intensive operators, the operator chain can start at the initial operator that uses such source data as an operand, and end at the candidate operator generating the reused tensor. In some implementations, a limit to the number of operators in an operator chain can be imposed. In other words, to avoid the operator chain from growing too big, the operator chain may have no more than a maximum threshold number of operators (e.g., up to 10 operators, up to 12 operators, or up to 15 operators, etc.). The maximum threshold number of operators can be a programmable value, and can be provided as user input into the compiler. The starting operator(s) of the determined operator chain can be referred to as the source operators.

Referring to FIG. 3, data flow graph 200 can be traversed back from candidate operator H to determine an operator chain, as indicated by the dotted arrows. Operators G, F, and E can each be a low arithmetic-intensive operator, and thus the operator chain may reach all the way back to operators E and F. By way of example, operator E can be a broadcast operator. Operator F can be a reshape operator. Operator G can be an addition operator to add the result of the broadcast operation to the result of the reshape operation. Operator H can be another reshape operator to reshape the result of the addition operator to generate the reused tensor. In the example shown, the operator chain starts with operators E and F, and ends with operator H generating the reused tensor. This is shown as operator chain 402 in FIG. 4, which includes operators E, F, G, and H.

Once an operator chain has been determined from a candidate operator, a profitability assessment for rematerializing the operator chain can be performed. In some implementations, the profitability is determined by comparing the memory footprint of the source data for the source operand(s) of the operator chain with the memory footprint of the tensor generated at the end of the operator chain. For example, the memory footprint can be measured in the number of bytes that the data occupies. If the memory footprint of the source data is less than the memory footprint of the tensor, then the rematerialization of the operator chain can be deemed profitable. In some implementations, the amount of compute being rematerialized or the number of operators in the operator chain can also be taken into account when assessing profitability.

Figure 4:
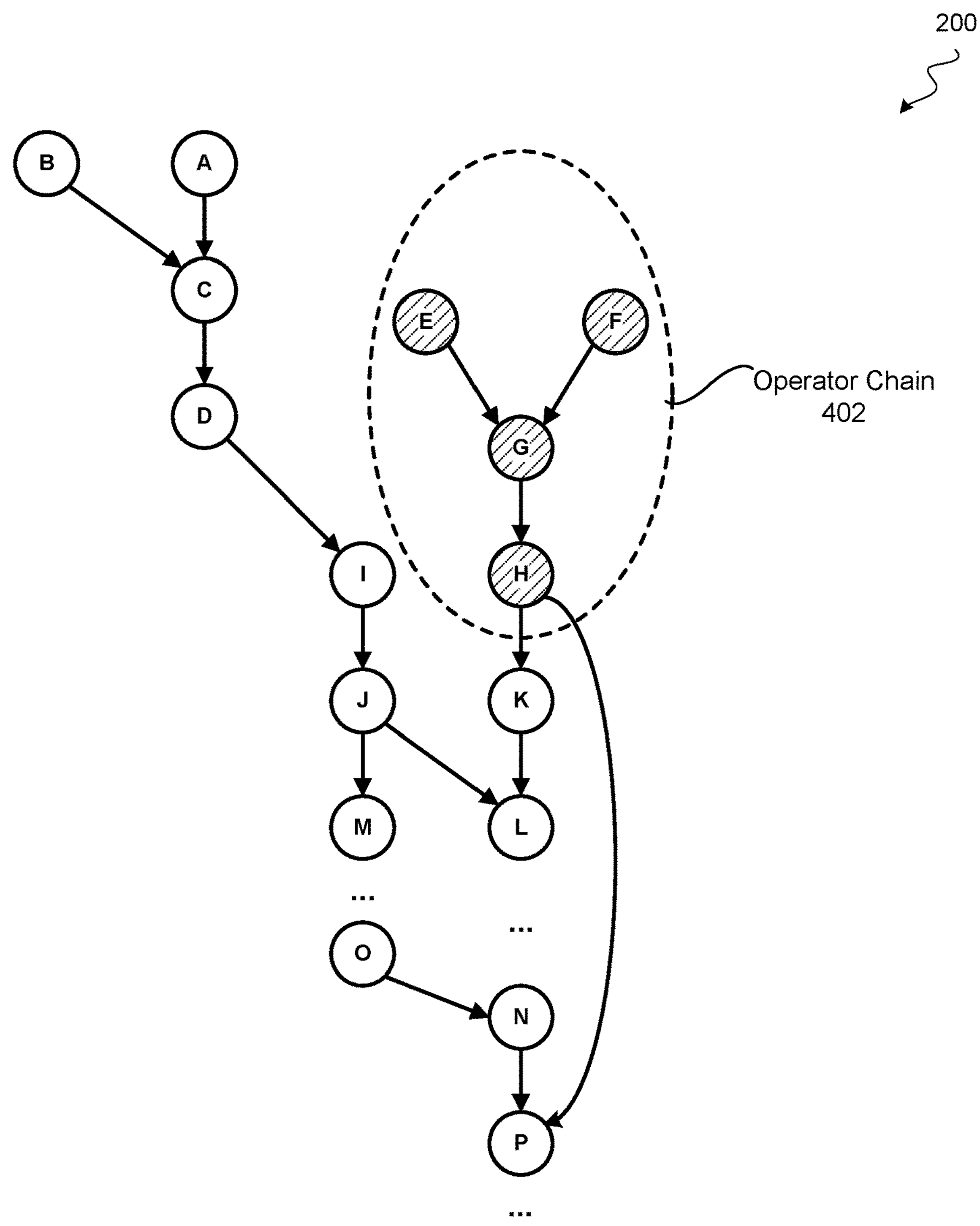
FIG. 4 shows an example of an operator chain for rematerialization in a data flow graph.

Referring to the example of FIG. 4, given that one of the source operators (operator E) of the operator chain 402 is a broadcast operator that copies source data into multiple memory locations (and thus expands the memory footprint), the operator chain 402 will most likely be profitable. As such, operator chain 402 is a good candidate for rematerialization to reduce the runtime memory footprint.

An operator chain that passes the profitability check can then be rematerialized. The operator chain can be rematerialized by inserting the operator chain in the data flow graph at the location where the tensor is reused. For example, the IR instructions associated with the operator chain can be added before the subsequent IR instruction that reuses the tensor.

Figure 5:
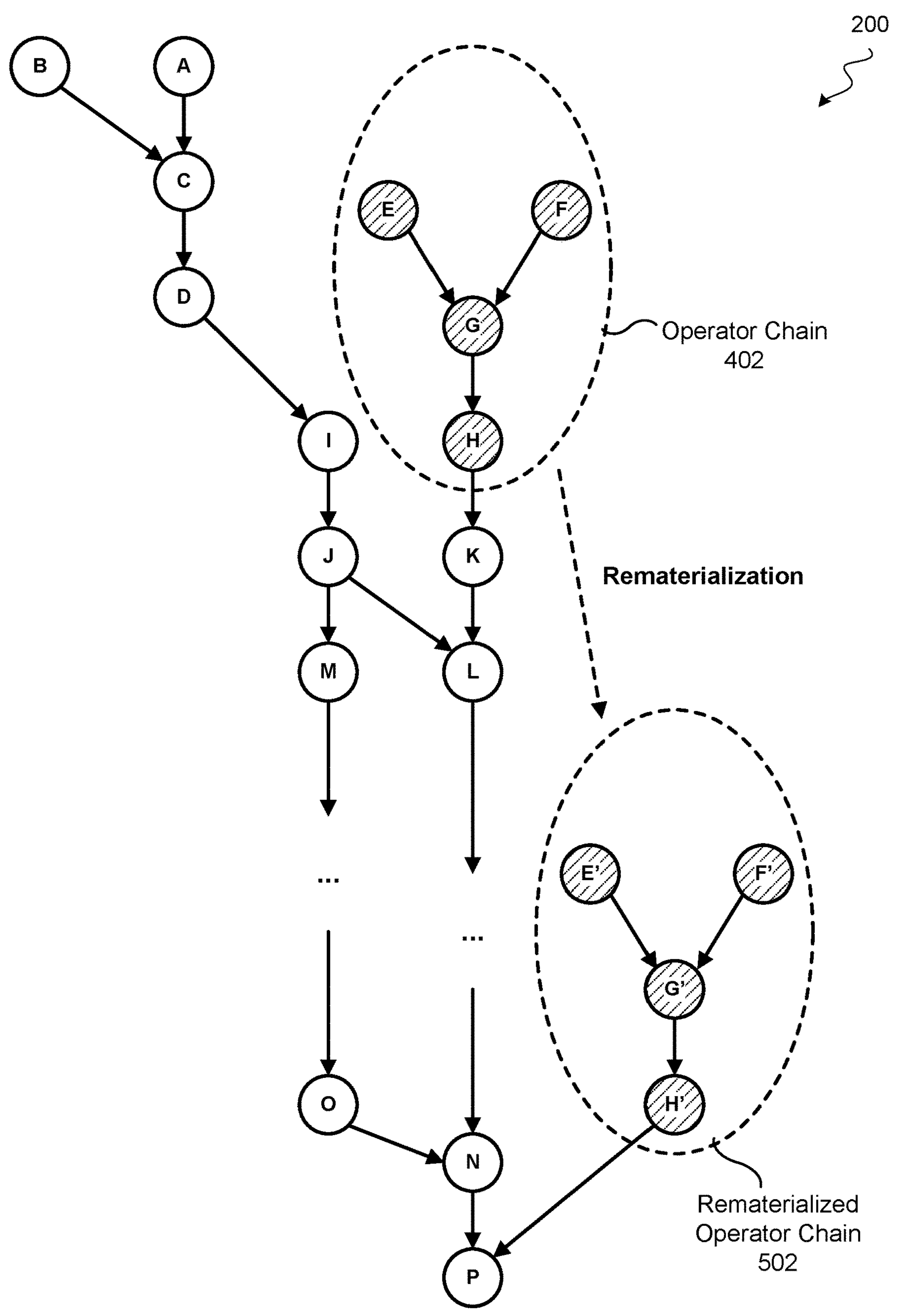
FIG. 5 shows an example of rematerializing an operator chain in a data flow graph.

Referring to FIG. 5, the tensor generated by operator chain 402 is subsequently reused by operator P. As such, operator chain 402 can be rematerialized by inserting a copy of operator chain 402 as rematerialized operator chain 502 before operator P. The dependency edge between candidate operator H and operator P can also be removed because operator P now depends from operator H' in rematerialized operator chain 502.

Figure 6:
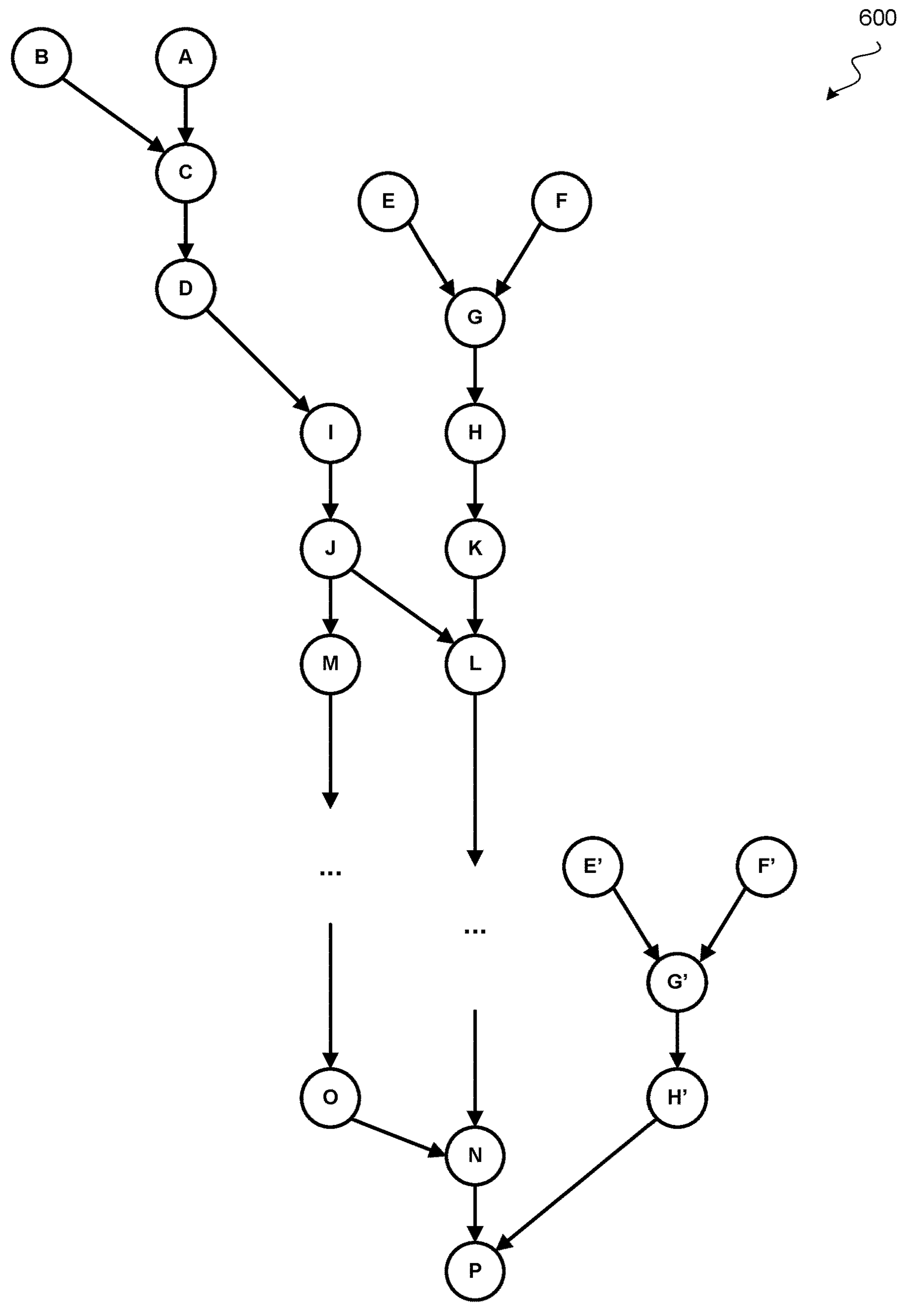
FIG. 6 shows an example of a modified data flow graph.

The modified data flow graph 600 is shown in FIG. 6. In data flow graph 600, there are two instances of the operator chain containing operators E, F, G, and H, with the rematerialized instance denoted as operators E', F', G', and H'. It should also be noted that some tensors can be rematerialized multiple times in the neural network if the tensor is reused in multiple places.

In some implementations, the inserted operator chain (e.g., in the form of inserted IR instructions) can be tagged with an indicator to prevent subsequent compilation steps from removing the inserted operator chain. Subsequent compilation steps such as redundancy elimination or copy elimination may view the rematerialized operator chain as redundant operations, and may attempt to remove the subsequent copy of the operators to optimize the IR. As such, metadata such as a "do-not-optimize" indicator can be added to the inserted section of the modified IR such that subsequent optimizations can skip over those sections of the modified IR containing the rematerialized operator chains.

Figure 7:
FIG. 7 shows a flow diagram of an example of a process to perform rematerialization.
Figure 7:
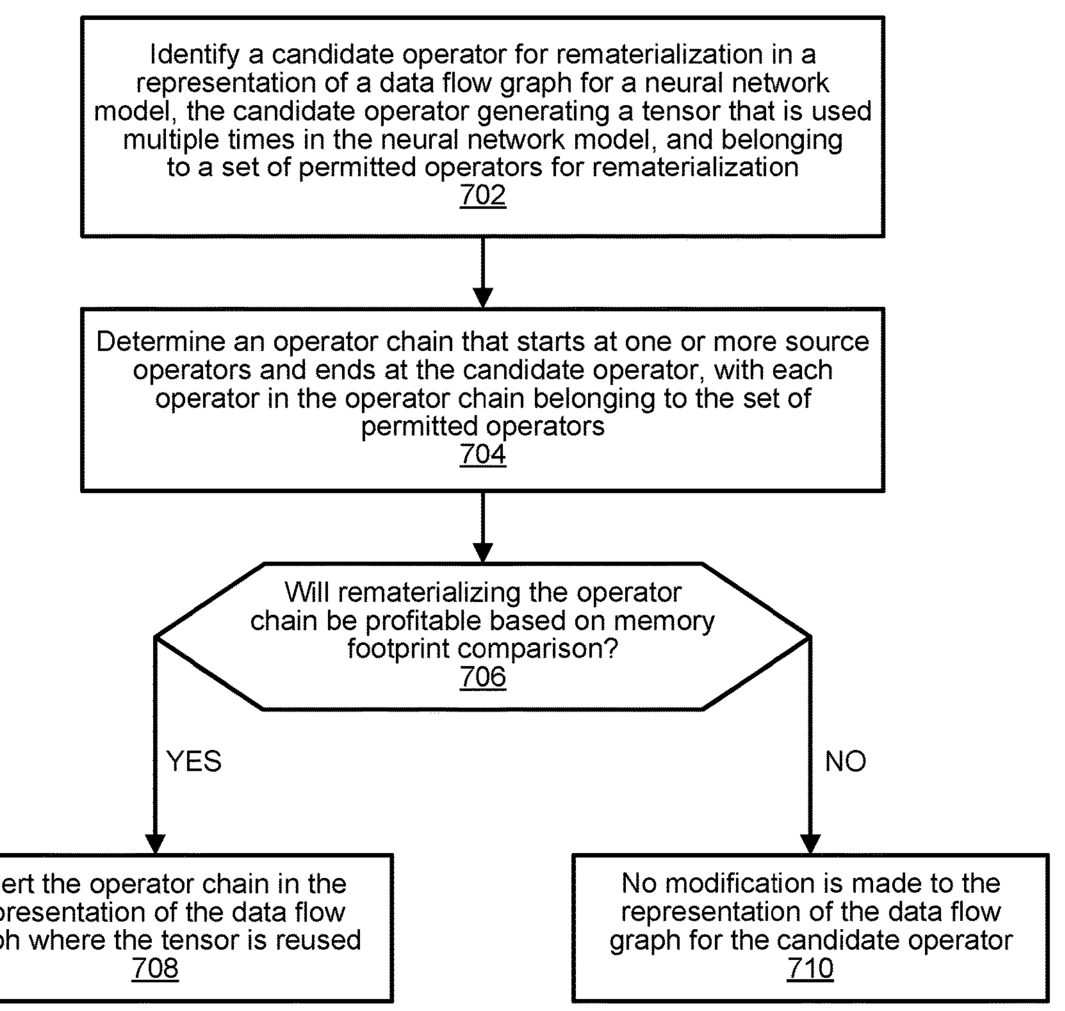

FIG. 7 illustrates a flow diagram of an example of a process 700 for compiling a neural network model. Process 700 can be performed, for example, by a compiler that interprets programming code describing the neural network model, and translates the programming code into machine instructions for execution on hardware (e.g., an integrated circuit device such as a neural network accelerator or an acceleration engine). In some implementations, process 700 can be implemented on a computer-readable medium that is executable by one or more processors of a computing system to compile the programming code of a neural network model for loading onto the integrated circuit device for execution.

Process 700 may begin at block 702 by identifying a candidate operator for rematerialization in a representation of a data flow graph for the neural network model. The data flow graph may include multiple operators represented by nodes that are connected by edges representing data dependencies. In some implementations, the representation of the data flow graph can be an intermediate representation (IR) of the neural network model generated by the compiler based on a description of a neural network model. The description of the neural network model can be, for example, source code written in a high-level programming language, such as Python, Java, C++, among other examples. In some implementations, the description of the neural network model may utilize software libraries tailored for neural networks such as TensorFlow, PyTorch, etc.

An operator can be identified as a candidate operator if the operator generates a tensor that is used multiple times in the neural network model, and if the operator belongs to a set of permitted operators for rematerialization. A tensor can be reused, for example, in a forward pass and a backward pass of the neural network model during a training process. In some implementations, a tensor is considered for rematerialization if the tensor is reused after a minimum threshold minimum number of operators.

The candidate operator can be identified, for example, by performing a linear scan of the representation of the data flow graph, and comparing each operator against the set of permitted operators. The set of permitted operators may contain low arithmetic-intensive operators such as data rearrangement operators, element-wise unary operators, and/or element-wise binary operators. The low arithmetic-intensive operators can have a linear computational complexity of O(n) or less. In some implementations, the minimum threshold number of operators for the distance of the tensor reuse, and the set of permitted operators can be configurable parameters in the compiler.

At block 704, an operator chain that starts at one or more source operators and ends at the candidate operator can be determined. Each operator in the operator chain belongs to the set of permitted operators. The operator chain can be determined by starting at the candidate operator identified at block 702, and traversing the data flow graph on the connected edges to preceding operators. If the preceding operator belongs to the set of permitted operators, the preceding operator is added to the operator chain. The operator chain can be grown from the candidate operator until the operator chain has reached an operator whose operand is a scalar or a functional data input into the neural network model, until the operator chain has reached a maximum threshold number of operators (e.g., a maximum allowable number of operators in an operator chain), or until none of the connected preceding operators are in the set of permitted operators. In some implementations, complex operators such as matrix multiplication and collective compute operators are not permitted to be in the operator chain, and these operators can be prohibited from being re-materialized because of the high computational costs and execution time hit associated with these operators. More generally, operator chains having an operator with a computational complexity that is greater than a linear complexity of O(n) can be excluded from being considered for rematerialization. In some implementations, the operator chain can also be constrained to be within the same layer of the neural network model, and/or between collective compute operations.

At block 706, a profitability of rematerializing the operator chain is determined based on a comparison of the memory footprint of source data for the one or more source operators, and the memory footprint of the tensor. The memory footprint can be determined as the number of bytes needed to store the respective data. Rematerializing the operator chain is deemed profitable if the memory footprint of source data is less than the reused tensor. In some implementations, rematerializing the operator chain can be deemed profitable if the memory footprint difference is above a certain percentage or above a threshold amount of memory. In some implementations, the execution time of the operator chain can also be considered for profitability. For example, a ratio of memory footprint reduction to number of operators in the operator chain can be used as a profitability metric.

At block 708, if rematerializing the operator chain is deemed profitable, the operator chain can be rematerialized by inserting the operator chain into the representation of the data flow graph where the tensor is reused. For example, the operator chain can be inserted at the backward pass or at other locations where the tensor is reused. In some implementations, the inserted operator chain can be in the form of IR instructions. Thus, a modified IR that contains multiple instances of the operator chain being rematerialized can be generated. The inserted operator chain can be tagged with an indicator to prevent subsequent compilation steps from removing the inserted operator chain. Machine code or machine instructions suitable for execution on an integrated circuit device (e.g., neural network accelerator or an acceleration engine) can then be generated from the modified intermediate representation for the neural network model.

At block 710, if rematerializing the operator chain is deemed not to be profitable, the operator chain and its dependencies can remain as they are (no change to the IR), and process 700 can be repeated to identify another candidate operator or operator chain for rematerialization consideration. An operator chain can be deemed not profitable, for example, if the source data is similar in size to the tensor. This may occur because the operator chain is unable to reach back further to the source of the data, for example, due to an intermediate operator in the data flow graph involving a complex computation.

Figure 8:
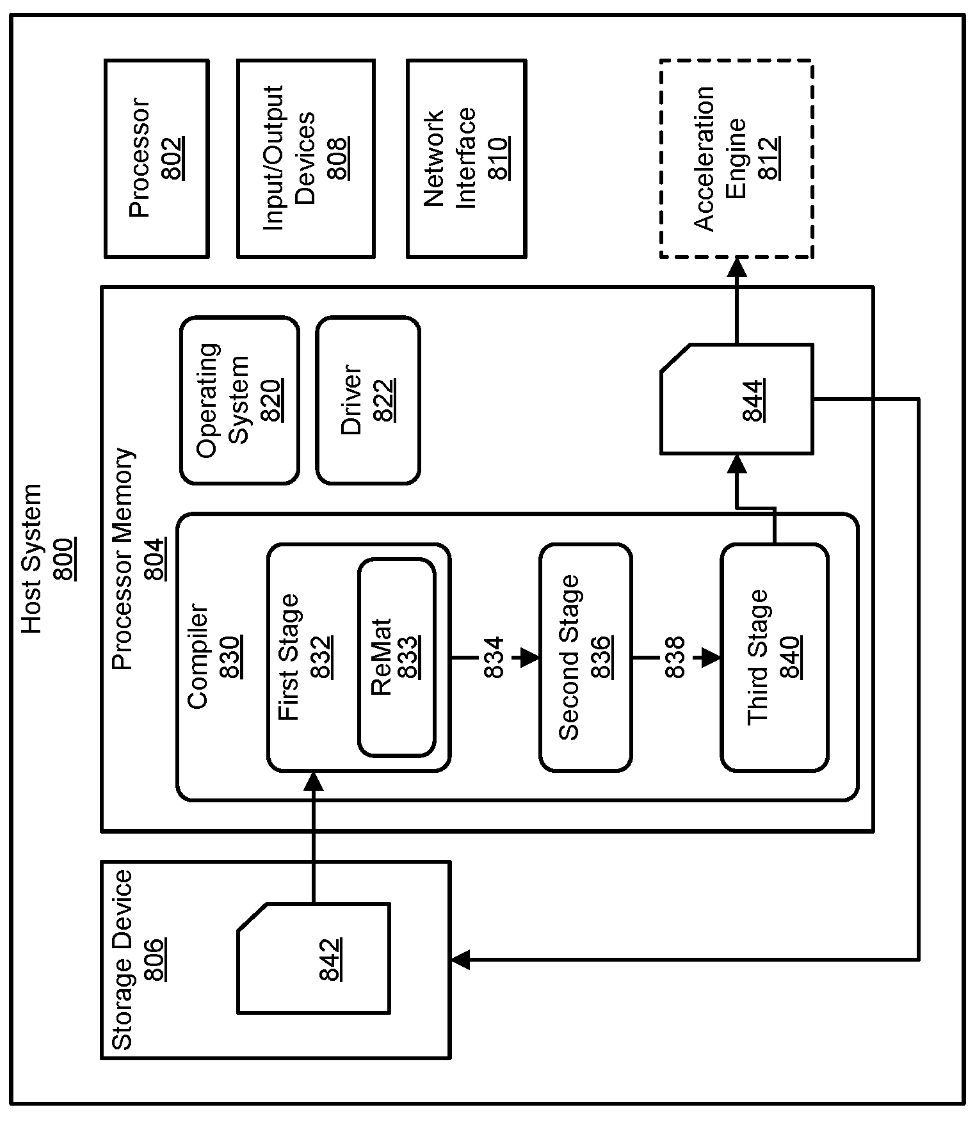
FIG. 8 illustrates a block diagram of an example of a compiler in a host system.

FIG. 8 illustrates a block diagram of an example of a host system 800 on which a compiler 830 can run. The illustrated host system 800 is an example of a computing device, and includes a processor 802, a processor memory 804, at least one storage device 806, various Input/Output (I/O) devices 808, and at least one network interface 810. In the example of FIG. 8, the host system 800 also includes an acceleration engine 812, which is an integrated circuit device that can accelerate certain operations or computations performed by the host system 800. In various examples, the host system 800 can be implemented as a server in a data center, a desktop computer, a laptop computer, a tablet computer, or a smartphone, among other examples. In some examples, operations or components discussed below as being performed or included in the host system 800 can be performed or included in other computer devices. For example, the compiler 830 can execute on the host system 800 while the acceleration engine 812 is located in a different host system or different computing device.

The processor 802 is an integrated circuit device that can execute program code, in the form of instructions. The program code can be for various software applications or tools, such as an operating system 820 or the illustrated compiler 830. While the processor 802 is executing a program, the instructions for the program can be stored in the processor memory 804. The instructions can also be stored elsewhere, such as on the storage device 806, and can be loaded into the processor memory 804 when needed by the processor 802. The processor 802 can also use the processor memory 804 for temporary storage of other data that the processor 802 is operating on. In various examples, the processor memory 804 is a volatile memory type, such as a type of random access memory, though non-volatile memory types can, alternatively or additionally, be used for the processor memory 804.

The storage device 806 is an example of a device that can include non-volatile memory. For example, the storage device 806 can be a magnetic disk drive, a solid-state drive, or an optical drive, among other examples. Program code and other data stored on the storage device 806 can remain present when the storage device 806 is not powered on. Storage device 806 can be uses as a type of non-transitory storage medium, or may include a reader that can access non-transitory storage medium.

The storage device 806 is one example of a peripheral device. A peripheral device is a component that can be coupled to the host system 800 to add functionality to the host system 800. Other examples of peripheral devices include Input/Output devices 808 and network interface 810. The Input/Output devices 808 can include user input and/or output devices, such as keyboard, mouse, pointer, touchpad, touchscreen, microphone, display screen, speaker, printer, and scanner, among other examples. Network interface 810, which can be implemented using a network interface card, can provide access to one or more networks. Network interface 810 can include, for example, a physical port for connecting a network cable and/or one or more antennas and/or radios for wireless communication such as Wi-Fi, cellular, and/or other over-the-air networks. Network interface 810 can also be described as an I/O device.

The acceleration engine 812 is also another type of peripheral device or I/O device. The acceleration engine 812 is a device that is purpose-built to perform certain operations that can be performed by the processor 802, but can be performed faster by the acceleration engine 812. For example, the acceleration engine 812 can be a neural network accelerator that is capable of performing large scale, parallel computations of a neural network more efficiently than when the computations are performed by the processor 802. As another example, the acceleration engine 812 can be a graphics processing unit (GPU), and may be optimized to perform the computations needed for graphics rendering. Other examples of devices that can be implemented by the acceleration engine 812 include cryptographic accelerators, compression and decompression accelerators, 3-D accelerators, regular expression accelerators, security accelerators, and others.

In various examples, the acceleration engine 812 can execute program code to perform certain operations. For example, when the acceleration engine 812 is a neural network accelerator, the acceleration engine 812 can be programmed to execute a particular neural network model, such as one that performs image recognition or one that performs machine translation. As a further example, to support the execution of a neural network model, the acceleration engine 812 can be programed to perform operations such as copying data for the neural network between processor memory 804 and the acceleration engine 812 (e.g., copying input data for the neural network from processor memory 804 into the acceleration engine 812, copying results from the acceleration engine 812 into the processor memory 804, etc.).

To generate program code for the acceleration engine 812, the host system 800 can execute the compiler 830. Compilers, in general, are software programs that translate program code written in a human-readable language into a format (e.g., machine instructions) that can be read and processed by an integrated circuit device. In the example of FIG. 8, the acceleration engine 812 can be a neural network accelerator, and the compiler 830 can be a compiler for compiling a neural network description into instructions to be executed by the acceleration engine 812. When the acceleration engine 812 implements a different type of accelerator, a different compiler can be used.

The compiler 830 can be activated, for example, when the operating system 820 receives keyboard, mouse, touchscreen, voice command, or other inputs from the Input/Output devices 808. The inputs can further include parameters for the compiler 830, such as input code 842 to compile and configuration options for the compilation process. Once the compiler 830 is activated, the processor 802 can load the instructions for the compiler 830 into the processor memory 804, and execute the compiler from the processor memory 804. In some implementations, compiler 830 may identifying steps to be performed by the processor 802, rather than by the acceleration engine 812. For example, the processor 802, through the execution of a driver 822, may need to perform steps such as configuring Direct Memory Access (DMA) descriptors for moving data into or out of the acceleration engine 812, among other examples.

In the example of FIG. 8, the compiler 830 includes a first stage 832, a second stage 836, and a third stage 840, which each perform different operations to produce compiled code 844. In other examples, the compiler 830 can combine the operations of the first stage 832, second stage 836, and/or third stage 840 into fewer stages, or can divide the operations of one or more of the stages into multiple stages. In some implementations, compiler 830 can also be modified such that certain operation(s) from one stage can be executed in a different stage.

The first stage 832 (may also be referred to as the front stage) can receive and process input code 842. The input code 842 can describe a program in a high-level programming language, such as Python, Java, C++, among other examples, and may utilize software libraries tailored for neural networks such as TensorFlow, PyTorch, etc. The input code 842 can be a description of a neural network model that describe, for example, steps to perform image recognition, speech recognition, machine translation, or other operations. The input code 842 can be obtained from the storage device 806. Alternatively, though not illustrated, the input code 842 can be located in the processor memory 804, or can be obtained from a network location using the network interface 810.

Processing of the input code 842 can include parsing the input code 842, performing syntax and semantic analysis on the input code 842 to identify operators (e.g., operations such as computations, memory accesses, and/or other functions, etc.) described in the input code 842, and sorting the operators described in the input code 842. For example, the operators described in the input code 842 can be sorted into layers, where the outputs of one layer provide the inputs to a next layer. The output of the first stage 832 can be an intermediate representation (IR) 834 of the input code 842. In some implementations, the IR 834 can be code representing a compute graph (e.g., data flow graph, data dependency graph, etc.). The compute graph may include nodes and edges connecting the nodes. The nodes may represent operators such as computations, data rearrangements such as transformations, memory accesses, and/or other operations; and the edges or connections between the nodes may represent dependencies between the nodes, such as data dependencies, memory dependencies, or operational dependencies, among other examples.

The compute graph can be organized, for example, in the layers, nodes, and connections between nodes of a neural network model. In some implementations, the rematerialization technique described herein (e.g., process 700) can be perform by a rematerialization block 833 in the first stage 832.

The second stage 836 (may also be referred to as the middle-end stage) can perform intermediate processing on the IR 834 output from the first stage 832. The intermediate processing may include performing various optimizations on the IR 834. The optimizations may include target independent optimizations that are hardware agnostic, and/or target specific optimizations that are tailored for the hardware architecture executing the program of input code 842. In some implementations, the rematerialization technique described herein (e.g., process 700) can alternatively be perform in the second stage 834. Target independent optimizations may include algebraic simplification, graph minimization such as removal of unnecessary or redundant operations and/or dependencies, high-level dependency optimization by rearranging operators to improve compute latencies, etc.

Target specific optimizations include optimizations that take into account the capabilities of the hardware (e.g., acceleration engine 812) that the input code is being compiled for. Such optimizations may include operators fusion to fuse multiple operators into an execution kernel supported by the hardware, data layout transformation to efficiently fit data into the hardware, etc. The target specific optimizations may take into account considerations such as whether the operations being performed in any one layer, or at any one node in a layer, may be too many for the acceleration engine 812 to perform at the same time. The acceleration engine 812 may, for example, have a limited amount of local storage space for the data needed for a computation, or the computations may be more than the acceleration engine 812 can perform at one time. In such scenario, the operators of the layer or node can be broken down into smaller operations, which can fit into the acceleration engine's local memory and/or can fit into the computing capacity of the acceleration engine 812. The output of the second stage 836 can be an optimized IR 838 such as code representing an optimized compute graph.

The third stage 840 (may also be referred to as the back-end stage) can operate on the output 838 of the second stage 836, and perform various steps before producing the instructions (e.g., machine code) that are to be executed by the acceleration engine 812. These steps can include instruction and data scheduling, register allocation, and/or code generation. Instruction and data scheduling determines the order in which instructions are executed and data are processed by the acceleration engine 812, and may include low-level dependency optimization by rearranging operations to improve parallel execution, handling dependencies between nodes by inserting synchronization instructions into the code, etc. Register allocation may include identifying optimizations in register usage and/or memory bandwidth usage to avoid spilling, and reordering of register and/or memory accesses to hide access latencies given the memory capacity of the hardware, etc. Code generation converts the low-level optimized IR into machine code executable by the acceleration engine 812, and includes mapping operations into hardware instructions according to the architecture of the acceleration engine 812. The output of the third stage 840 is compiled code 844, which may include machine instructions in binary format. In some examples, the compiled code 844 can be stored in the processor memory 804. Alternatively or additionally, the compiled code 844 can be copied to the storage device 806 or to a network location. As noted above, the acceleration engine 812 may be located at a different host system, in which case the compiled code 844 can be sent over the network interface 810 to the other host system.

In the example of FIG. 8, the host system 800 can be executing a driver 822, which can also be referred to as a device driver or runtime driver, that manages the acceleration engine 812. The driver 822 can provide an interface between applications executing on the host system 800 (or on another host system) and the acceleration engine 812. For example, the driver 822 can provide an Application Program Interface (API) that defines functions for feeding input data to the acceleration engine 812 and defining the operation to perform on the input data. In this and other examples, the driver 822 can configure the acceleration engine 812 to perform the operation. For example, the driver 822 can identify a neural network model that the acceleration engine 812 is to execute, as well as the location in the processor memory 804 or on the storage device 806 where the compiled code 844 for the neural network model is located. The driver 822 can further load into the acceleration engine 812 or cause the acceleration engine 812 to load the compiled code 844, can load or cause the acceleration engine 812 to load the input data on which the neural network model is to operate, and/or can cause the acceleration engine 812 to begin executing on the input data. Once the acceleration engine 812 has finished, the acceleration engine 812 can notify the driver 822, and the driver 822 can deliver a result back to the application that requested the result.

Figure 9:
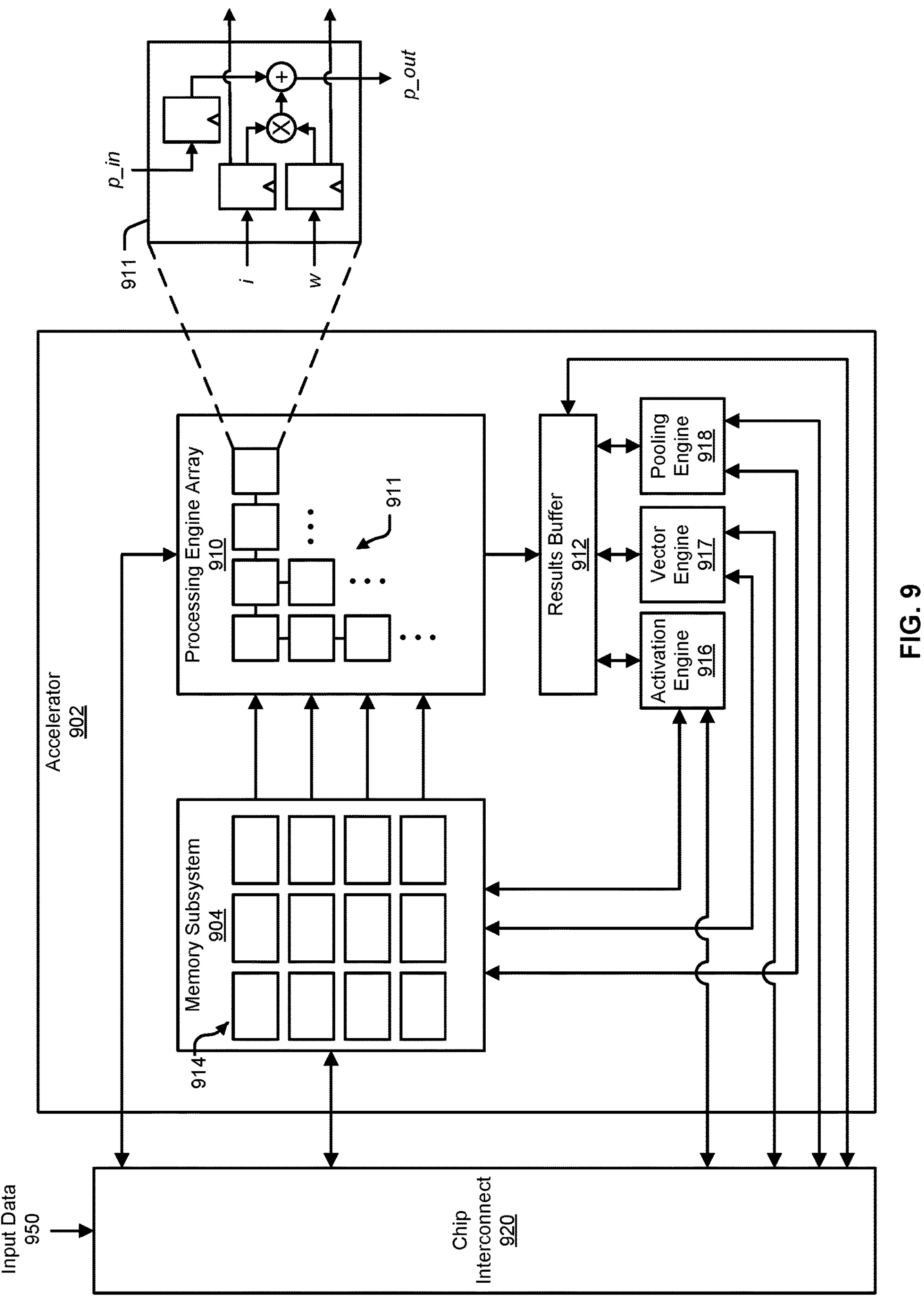
FIG. 9 illustrates a block diagram of an example of an integrated circuit device.

FIG. 9 is a block diagram illustrating an example of an integrated circuit device that can include an accelerator 902. In various examples, the accelerator 902, for a set of input data (e.g., input data 950), can execute computations using a processing engine array 910, an activation engine 916, a vector engine 917, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. Memory subsystem 904 can also be referred to as a state buffer. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the vector engine 917, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916, the vector engine 917, and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 128 rows, or some other number of columns and/or rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

In some implementations, the accelerator 902 can further include a vector engine 917. Vector engine 917 is a compute engine that can perform computations and manipulations on values stored in memory subsystem 904 and/or results buffer 912 such as values representing matrices of input values, weight values, intermediate results, etc. Vector engine 917 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 917 can operate in parallel and/or simultaneously. In some examples, the vector engine 917 can be bypassed or be omitted.

Herein, the activation engine 916, the vector engine 917, and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916, the vector engine 917, and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network.

The final results can be stored in the memory subsystem 904 and then be copied out to host processor memory or to another location.

Figure 10:
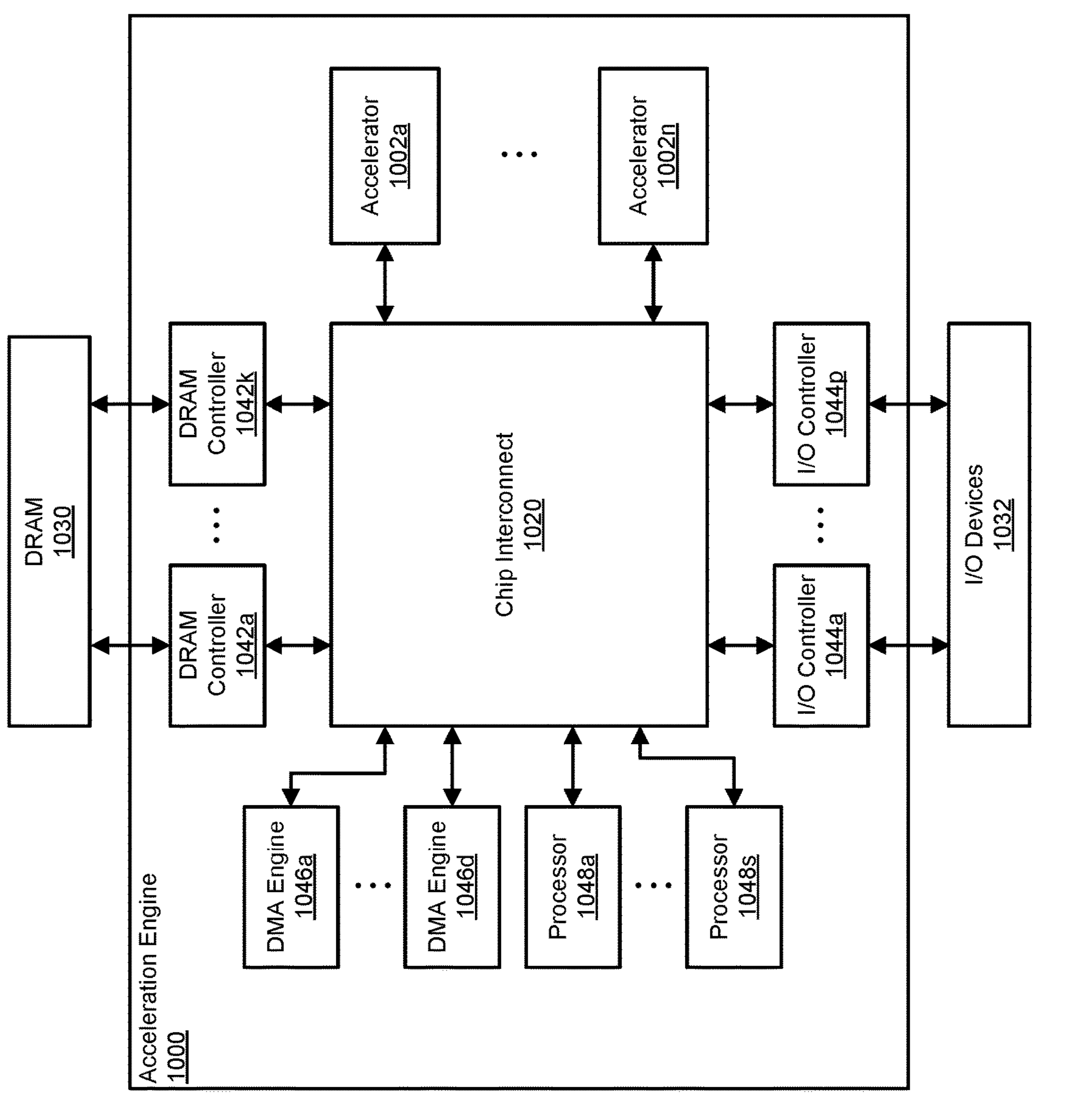
FIG. 10 illustrates a block diagram of an example of an acceleration engine.

FIG. 10 includes a block diagram that illustrates an example of an acceleration engine 1000. The acceleration engine 1000 is an example of an integrated circuit that can include one or more accelerators 1002*a*-1002*n* that may be similar to the accelerator illustrated in FIG. 9.

In the example of FIG. 10, the acceleration engine 1000 includes multiple accelerators 1002*a*-1002*n*, each of which can perform a set of operations. In various examples, the accelerators 1002*a*-1002*n* are for particular types of operations, so that the accelerators 1002*a*-1002*n* can perform the operations much faster than when similar operations are performed by a general-purpose processor. In various examples, to perform a set of operations, input data on which the operations are to be performed must first be moved into the accelerators 1002*a*-1002*n*. Additionally, in some cases, program code is also moved into the accelerators 1002*a*-1002*n*, which programs the operations that the accelerators 1002*a*-1002*n* will perform on the data. In the illustrated example, the acceleration engine 1000 includes n accelerators 1002*a*-1002*n*. Examples of accelerators that can be included in the acceleration engine 1000 include graphics accelerators, floating point accelerators, neural network accelerators, and others. In various examples, the accelerators 1002*a*-1002*n* can each be the same (e.g., each of the is a graphics accelerator) or can be different (e.g., the accelerators 1002*a*-1002*n* include a graphics accelerator, a floating point accelerator, and neural network accelerator).

The example acceleration engine 1000 further includes DRAM controllers 1042*a*-1042*k* for communicating with an external memory. The external memory is implemented, in this example, using DRAM 1030. In the illustrated example, the acceleration engine 1000 includes k DRAM controllers 1042*a*-1042*k*, each of which may be able to communicate with an independent set of banks of DRAM. In other examples, other types of RAM technology can be used for the external memory. The DRAM controllers 1042*a*-1042*k* can also be referred to as memory controllers.

In various examples, input data and/or program code for the accelerators 1002*a*-1002*n* can be stored in the DRAM 1030. Different programs can cause the accelerators 1002*a*-1002*n* to perform different operations. For example, when one of the accelerators is a neural network accelerator, one program can configure the neural network accelerator to perform speech recognition while another program can configure the neural network accelerator to perform image recognition. In various examples, different accelerators 1002*a*-1002*n* can be programmed with different programs, so that each performs a different set of operations. In various examples, the processors 1048*a*-1048*s* can manage moving of program code from the DRAM 1030 to the accelerators 1002*a*-1002*n*.

The example acceleration engine 1000 further includes I/O controllers 1044*a*-1044*p* for communicating with I/O devices 1032 in the system. The acceleration engine 1000 can communicate with I/O devices over, for example, a processor bus. In some examples, the processor bus can be implemented using Peripheral Component Interconnect (PCI) and/or a variation of the PCI bus protocol. The processor bus can connect the acceleration engine 1000 to I/O devices such as, for example, input and output devices, memory controllers, storage devices, and/or network interface cards, among other things. In some examples, the I/O controllers 1044-1044*p* can enable the acceleration engine 1000 to act as an I/O device for a host processor. For example, the acceleration engine 1000 can be the recipient of input data from the host processor, and a command indicating an operation to be performed on the input data (e.g., a particular computation or analysis). In the illustrated example, the acceleration engine 1000 includes p I/O controllers 1044*a*-1044*p*, each of which may include a separate root complex and may communicate with a separate set of I/O devices 1032. In other examples, other standardized bus protocols, such as Ultra Path Interconnect (UPI) can be used for the host bus. In other examples, a proprietary bus protocol can be used.

Movement of data in the acceleration engine 1000 can be managed by one or more processors 1048*a*-1048*s*, which can also be referred to as data management processors. In the example of FIG. 10, the acceleration engine 1000 includes s processors 1048*a*-1048*s* incorporated into the device (e.g., on the same silicon die). In other examples, the processors 1048*a*-1048*s* can be external to the acceleration engine 1000 (e.g., on a different die and/or in a different package). In some examples, the processors 1048*a*-1048*s* can manage the movement of data from I/O devices 1032 to the accelerators 1002*a*-1002*n* or the DRAM 1030. For example, input data may be located at an I/O device 1032 or in processor memory, and the processors 1048*a*-1048*s* can move the input from the I/O device 1032 or processor memory into an accelerator or into DRAM 1030. As another example, program code for the accelerators 1002*a*-1002*n* may be located on an I/O device 1032 or in processor memory.

The example acceleration engine 1000 further includes DMA engines 1046*a*-1046*d* that can move data between the accelerators 1002*a*-1002*n*, DRAM controllers 1042*a*-1042*k*, and I/O controllers 1044*a*-1044*p*. In the illustrated example, the acceleration engine 1000 includes d DMA engines 1046*a*-1046*d*. In some implementations, the DMA engines 1046*a*-1046*d* can be assigned to specific tasks, such as moving data from the DRAM controllers 1042*a*-1042*d* to the accelerators 1002*a*-1002*n*, or moving data between the I/O controllers 1044*a*-1044*p* and the accelerators 1002*a*-1002*n*. These tasks can be assigned, for example, by enqueueing descriptors with the DMA engines 1046*a*-1046*d*, where a descriptor identifies an address for a block of data and an operation (e.g., a read or a write) to perform. A descriptor, for example, can direct a DMA engine to instruct a DMA controller to read a block of data from DRAM 1030. A descriptor can, as a further example, instruct the DMA engine to write data, read by the DMA controller, to an accelerator. Further descriptors can be used to move data from an accelerator to DRAM 1030.

In various examples, each of the processors 1048*a*-1048*s* can be responsible for managing the data movement for a different accelerator. In some examples, a processor may manage the data movement for more than one accelerator. Similarly, in various examples, each of the processors 1048*a*-1048*s* can be assigned to one or more DMA engines 1046*a*-1046*d*. In these and other examples, associations between processors 1048*a*-1048*s*, accelerators 1002*a*-1002*n*, and DMA engines 1046*a*-1046*d* are determined by program code being executed by each respective processor.

In the example acceleration engine 1000, the various components can communicate over a chip interconnect 1020. The chip interconnect 1020 primarily includes wiring for routing data between the components of the acceleration engine 1000. In some cases, the chip interconnect 1020 can include a minimal amount of logic, such as multiplexors to control the direction of data, flip-flops for handling clock domain crossings, and timing logic.

Figure 11:
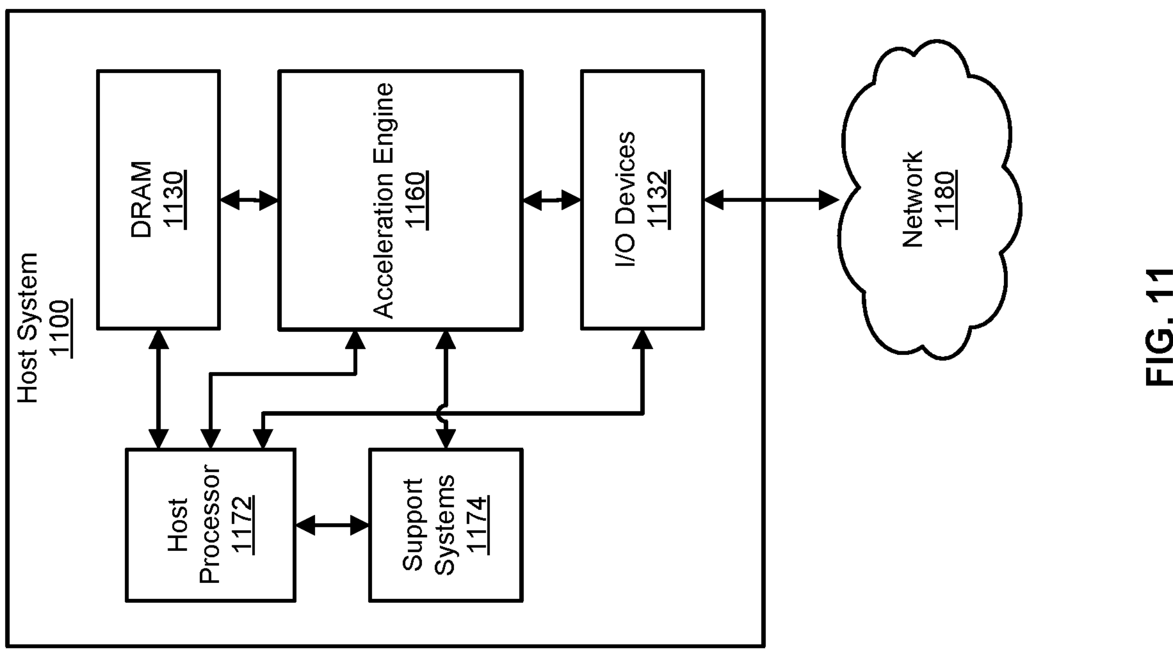
FIG. 11 illustrates a block diagram of an example of a host system.

FIG. 11 includes a block diagram that illustrates an example of a host system 1100 in which an acceleration engine 1160 can be used. The acceleration engine 1160 of FIG. 11 is an example of a device that can include one or more accelerators such as is illustrated in FIG. 10. The example host system 1100 of FIG. 11 includes the acceleration engine 1160, a host processor 1172, DRAM 1130 or processor memory, I/O devices 1132, and support systems 1174. In various implementations, the host system 1100 can include other hardware that is not illustrated here.

The host processor 1172 is a general-purpose integrated circuit that is capable of executing program instructions. In some examples, the host processor 1172 can include multiple processing cores. A multi-core processor may include multiple processing units within the same processor. In some examples, the host system 1100 can include more than one host processor 1172. In some examples, the host processor 1172 and the acceleration engine 1160 can be one chip, such as, one or more integrated circuits within the same package.

In various examples, the host processor 1172 can communicate with other components in the host system 1100 over one or more communication channels. For example, the host system 1100 can include a host processor bus, which the host processor 1172 can use to communicate with the DRAM 1130, for example. As another example, the host system 1100 can include an I/O bus, such as a PCI-based bus, over which the host processor 1172 can communicate with the acceleration engine 1160 and/or the I/O devices 1132, for example. In various examples, the host system 1100 can, alternatively or additionally, include other communication channels or busses, such as serial busses, power management busses, storage device busses, and so on.

In some examples, software programs executing on the host processor 1172 can receive or generate input for processing by the acceleration engine 1160. In some examples, the programs can select an appropriate neural network to execute for a given input. For example, a program may be for language translation, and can select one or more neural networks capable of speech recognition and/or machine translation. In these and other examples, the programs can configure the acceleration engine 1160 with the neural network to execute, and/or can select a neural network processing engine on the acceleration engine 1160 that has previously been configured to execute the desired neural network. In some examples, once the acceleration engine 1160 has started an inference on input data, the host processor 1172 can manage the movement of data (such as weights, instructions, intermediate results, results of conditional layers, and/or final results) into or out of the acceleration engine 1160.

In some examples, a software program that is using the acceleration engine 1160 to conduct an inference can read the result from a conditional layer from the acceleration engine 1160 and/or from a storage location, such as in DRAM 1130. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1130 is memory that is used by the host processor 1172 for storage of program code that the host processor 1172 is in the process of executing, as well as values that are being operated on. In some examples, the data for a neural network (e.g., weight values, instructions, and other data) can be all or partially stored in the DRAM 1130. DRAM is a common term for processor memory, and though DRAM is volatile memory, processor memory can be volatile and/or non-volatile. Though not illustrated here, the host system 1100 can include other volatile and non-volatile memories for other purposes. For example, the host system 1100 can include a Read-Only Memory (ROM) that stores boot code for booting the host system 1100 at power on, and/or Basic Input/Output System (BIOS) code.

Though not illustrated here, the DRAM 1130 can store instructions for various programs, which can be loaded into and be executed by the host processor 1172. For example, the DRAM 1130 can be storing instructions for an operating system, one or more data stores, one or more application programs, one or more drivers, and/or services for implementing the features disclosed herein.

The operating system can manage and orchestrate the overall operation of the host system 1100, such as scheduling tasks, executing applications, and/or controller peripheral devices, among other operations. In some examples, a host system 1100 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers.

Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1100. For example, some drivers can provide communication between the operating system and peripheral devices or I/O devices 1132. Alternatively or additionally, some drivers may provide communication between application programs and the operating system, and/or application programs and peripheral devices accessible to the host system 1100. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1132 can include hardware for connecting to user input and output devices, such as keyboards, mice, pens, tablets, voice input devices, touch input devices, displays or monitors, speakers, and printers, among other devices. The I/O devices 1132 can also include storage drives and/or network interfaces for connecting to a network 1180. For example, the host system 1100 can use a network interface to communicate with storage devices, user terminals, other computing devices or servers, and/or other networks, among various examples.

In various examples, one or more of the I/O devices 1132 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1100 or may be in an external enclosure. A storage device can be fixed (e.g., attached by screws) or removable (e.g., having a physical release mechanism and possibly a hot-plug mechanism).

Storage devices, the DRAM 1130, and any other memory component in the host system 1100 are examples of computer-readable storage media. Computer-readable storage media are physical mediums that are capable of storing data in a format that can be read by a device such as the host processor 1172. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1132 can be PCI-based devices. In these examples, a PCI-based I/O device includes a PCI interface for communicating with the host system 1100. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1174 can include hardware for coordinating the operations of the acceleration engine 1160. For example, the support systems 1174 can include a microprocessor that coordinates the activities of the acceleration engine 1160, including moving data around on the acceleration engine 1160. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1172. In some examples, the program executed by the microprocessor is stored on the hardware of microprocessor, or on a non-volatile memory chip in the host system 1100. In some examples, the microprocessor and the acceleration engine 1160 can be on chip, such as one integrated circuit on the same die and in the same package.

In some examples, the support systems 1174 can be responsible for taking instructions from the host processor 1172 when programs executing on the host processor 1172 request the execution of a neural network. For example, the host processor 1172 can provide the support systems 1174 with a set of input data and a task that is to be performed on the set of input data. In this example, the support systems 1174 can identify a neural network that can perform the task, and can program the acceleration engine 1160 to execute the neural network on the set of input data. In some examples, the support systems 1174 only needs to select an appropriate neural network processing engine of the neural network processor. In some examples, the support systems 1174 may need to load the data for the neural network onto the acceleration engine 1160 before the acceleration engine 1160 can start executing the neural network. In these and other examples, the support systems 1174 can further receive the output of executing the neural network, and provide the output back to the host processor 1172.

In some examples, the operations of the support systems 1174 can be handled by the host processor 1172. In these examples, the support systems 1174 may not be needed and can be omitted from the host system 1100.

In various examples, the host system 1100 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1100 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail.

It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method, comprising:

identifying a candidate operator for rematerialization in an intermediate representation of a data flow graph for a neural network model, the candidate operator generating a tensor that is used multiple times in the neural network model, and belonging to a set of permitted operators for rematerialization;

determining an operator chain that starts at one or more source operators and ends at the candidate operator, wherein each operator in the operator chain belongs to the set of permitted operators;

determining a profitability of rematerializing the operator chain based on a comparison of a memory footprint of source data for the one or more source operators, and a memory footprint of the tensor;

in response to determining that rematerializing the operator chain is profitable, generating a modified representation of the data flow graph by inserting the operator chain in the intermediate representation of the data flow graph where the tensor is reused to rematerialize the operator chain; and compiling the modified representation of the data flow graph into machine code implementing the neural network model having a reduced runtime memory footprint as compared to the intermediate representation.

2. The computer-implemented method of claim 1, wherein the set of permitted operators contains low arithmetic-intensive operators.

3. The computer-implemented method of claim 2, wherein the low arithmetic-intensive operators include data rearrangement operators, element-wise unary operators, and element-wise binary operators.

4. The computer-implemented method of claim 1, wherein identifying the candidate operator for rematerialization comprises:

performing a linear scan of the intermediate representation of the data flow graph; and comparing each operator in the operator chain against the set of permitted operators.

5. The computer-implemented method of claim 1, wherein an operator in the data flow graph is identified as a candidate operator for rematerialization if the tensor generated by the operator is reused after a minimum threshold number of operators.

6. The computer-implemented method of claim 1, wherein an operator chain containing an operation with a computational complexity that is greater than a linear complexity of O(n) is excluded from being considered for rematerialization.

7. The computer-implemented method of claim 1, wherein an operator chain containing a matrix multiplication operation is excluded from being considered for rematerialization.

8. The computer-implemented method of claim 1, wherein an operator chain that is part of a collective compute operation is excluded from being considered for rematerialization.

9. The computer-implemented method of claim 1, wherein the operator chain being considered for rematerialization has a number of operators that is less than or equal to a maximum allowable number of operators.

10. The computer-implemented method of claim 9, wherein the maximum allowable number of operators is programmable.

11. The computer-implemented method of claim 1, wherein the operator chain is within a same layer of the neural network model.

12. The computer-implemented method of claim 1, wherein the operator chain is between collective compute operations.

13. The computer-implemented method of claim 1, wherein the operator chain is inserted in a backward pass of a training process in the intermediate representation of the data flow graph.

14. The computer-implemented method of claim 1, wherein the source data is a scalar or input data into the neural network model.

15. The computer-implemented method of claim 1, wherein the inserted operator chain is tagged with an indicator to prevent subsequent compilation steps from removing the inserted operator chain.

16. A non-transitory computer readable medium having stored therein instructions that, when executed by one or more processors, cause the one or more processors to execute a compiler, the compiler performing operations including:

identifying a candidate operator for rematerialization in an intermediate representation of a data flow graph for a neural network model, the candidate operator generating a tensor that is used multiple times in the neural network model, and belonging to a set of permitted operators for rematerialization;

determining an operator chain that starts at one or more source operators and ends at the candidate operator, wherein each operator in the operator chain belongs to the set of permitted operators;

determining a profitability of rematerializing the operator chain based on a comparison of a memory footprint of source data for the one or more source operators, and a memory footprint of the tensor;

in response to determining that rematerializing the operator chain is profitable, generating a modified representation of the data flow graph by inserting the operator chain in the intermediate representation of the data flow graph where the tensor is reused to rematerialize the operator chain; and compiling the modified representation of the data flow graph into machine code implementing the neural network model having a reduced runtime memory footprint as compared to the intermediate representation.

17. The non-transitory computer readable medium of claim 16, wherein an operator in the data flow graph is identified as a candidate operator for rematerialization if the tensor generated by the operator is reused after a minimum threshold number of operators.

18. The non-transitory computer readable medium of claim 17, wherein the operator chain being considered for rematerialization has a number of operators that is less than or equal to a maximum allowable number of operators.

19. The non-transitory computer readable medium of claim 18, wherein the inserted operator chain is tagged with an indicator to prevent subsequent compilation steps from removing the inserted operator chain.

20. The computer-implemented method of claim 1, wherein rematerializing the operator chain is determined to be profitable when the memory footprint of the source data is less than the memory footprint of the tensor.

21. The computer-implemented method of claim 1, wherein rematerializing the operator chain is determined to be profitable when the memory footprint of the source data is less than the memory footprint of the tensor by at least a certain percentage or at least a threshold amount of memory.

22. The computer-implemented method of claim 1, wherein a ratio of a memory footprint reduction between the source data and the tensor to a number of operators in the operator chain is used as a profitability metric.

23. The computer-implemented method of claim 1, wherein the operator chain is inserted multiple times in the intermediate representation of the data flow graph.

* * * * *